FIG. 1

INVENTOR.
FRANK B. SWEENEY
BY
Kane, Dalsimer and Kane

FIG. 3

INVENTOR.
FRANK B. SWEENEY
BY Kane, Dalsimer and Kane

FIG. 4

INVENTOR.
FRANK B. SWEENEY
BY Kane, Dalsimer and Kane

FIG. 5

INVENTOR.
FRANK B. SWEENEY
BY Kane, Dalsimer and Kane

FIG. 6

United States Patent Office 3,002,207
Patented Oct. 3, 1961

3,002,207
SOLE SPLITTING MACHINE
Frank B. Sweeney, Rochester, N.Y., assignor to Endicott Johnson Corporation, Endicott, N.Y., a corporation of New York
Filed Aug. 13, 1958, Ser. No. 754,801
7 Claims. (Cl. 12—17)

In general, this invention relates to a structurally and functionally improved article thickness reducing machine and more specifically to an improved machine for splitting soles and the like.

An object of this invention is to provide an improved machine for splitting soles so that two or more soles are possible from a single prefabricated article having a sole configuration, and in cases where this article is molded and formed with integrally extending flashes, to increase the number of soles from an article to be trimmed of its flash.

Another object is to provide an improved machine for splitting soles formed from such material as rubber or leather, and if desired a machine for reducing the thickness of these soles during a sole trimming operation.

Still another object is the provision of readily replaceable power feed rolls after they have served their usefulness in apparatus for splitting soles and the like.

A further object is the provision of a power driven roll assembly for a sole splitting machine which can be readily adjusted and which possesses that degree of resiliency for enhancing power roll life.

A still further object is the provision of a sole splitting machine having power driven rolls mounted on pivotal arms which cooperate to couple these rolls to a gear train which, in turn, is so constructed and arranged to have certain of its components shift in response to the pivoting of the arms without detrimentally affecting the gear drive for the power rolls.

An important object is the provision of a sole splitting machine having power driven rolls mounted on pivotal arms which are adapted to be adjusted relative to one another by means of a differentially pitched threaded shaft adjusting mechanism which may have coupled therewith a chain and sprocket arrangement for insuring uniform relative shifting of another similar adjusting mechanism.

Another important object is to provide a sole splitting machine capable of optimum output and embracing relatively few parts, each relatively simple and inexpensive to manufacture as well as assembly at decreased costs, and further which machine possesses the element of adjustability and interchangeability as well as versatility in its application to particular articles to be reduced in thickness or split.

Numerous other objects and advantages will become apparent from the following description of the invention, which is to be taken in conjunction with the accompanying drawings illustrating a single practical embodiment, in which.

In the drawings, numeral 10 represents a portion of the top of a table support. This table support 10 conveniently mounts a pair of foot rests 12 and 14 which form a part of the frame of the subject sole splitting machine. Additionally included within this framework is a pair of side plates 16 and 18 which are secured in suitably formed notches in the foot rest 12. A pair of auxiliary plates 20 and 22 are secured to the outer face of side plates 16 and 18, respectively, and together with the latter plates, are fixedly mounted in suitably formed notches in the foot rest 14. A plurality of tie rods 24 are interposed between the side plates 16 and 18 and are suitably anchored therein for cooperating in maintaining these plates in the desired spaced-apart relationship. However, it is preferred that these tie rods be appropriately located so that they do not interfere with the various functional elements of the apparatus.

Reference is now made to the hopper and feed assembly, designated generally by the numeral 26, for feeding sequentially one of a plurality of stacked articles, which for purposes of this description, will be taken to be molded soles, to the actual splitting or thickness reducing stage. The hopper side walls of this assembly are defined by zones of the side plates 16 and 18, as well as the adjustable gate slide 28 which is slidably mounted on the transversely extending partition plate 30 in substantial face-to-face contact. The gate slide 28 has extending laterally therefrom a tapped adjusting nut 32 which is displaceable in a longitudinally extending slot 34 formed in the partitioning plate 30. A mounting block 36 is fixed to the partitioning plate 30 and includes a bore 37 through which passes a threaded adjusting screw 38 having a knurled adjusting screw knob 40. The adjusting screw 38 is ordinarily engaged with the internal threads presented by the adjusting nut 32 and consequently, when the adjusting screw knob 40 is turned in either a clockwise direction or counter-clockwise direction, a corresponding longitudinal displacement will be effected of the slide 28 with respect to the partitioning plate 30.

An endless conveyor belt assembly 41 functions to feed an unsplit sole to the cutting stage of my sole splitting machine and additionally to present the lower or bottom mounting surfaces of the hopper and feed assembly 26 for cooperating to mount a plurality of unsplit soles in a substantially stacked arrangement. Included in this conveyor belt assembly 41 is a roll 42 and belt conveyor 43.

The roll 42 comprises a shaft 44 journaled in suitable bearings 46, which are mounted by the side plates 16 and 18 substantially as illustrated. A pair of roller elements 48 and 50 are mounted on the rotatable shaft 44 to complete this particular roller structure. As will become apparent shortly, this roller cooperates with the trailing edge of the endless belt conveyor 43 as well as the beveled face 52 of the gate slide 28 to maintain the stacked unsplit soles in the hopper and feed assembly 26 at an incline with respect to the horizontal or plane of the upper receiving surfaces of the subject endless belt conveyor 43. These conveyor belt receiving surfaces in conjunction with the lower edge of the gate slide 28 function to permit a single unsplit sole to pass through the gate opening presented thereby. It has been found that the sole immediately above the lowermost sole in the hopper and feed assembly 26 had a tendency to pass beneath the gate 28 because of the appreciable amount of friction present between contacting unsplit soles, especially when they are formed from a moldable rubber composition. Consequently, this amount of friction is minimized by arranging the unsplit soles above the lowermost sole in the hopper and feed assembly 26 at an incline with respect to the receiving surfaces of the endless belt conveyor 43. By providing an incline of approximately 15°, the lowermost unsplit sole, which will assume a horizontal position, is permitted to pass through the gate slide 28 without hindering or upsetting the desired inclination of the remaining unsplit soles.

As mentioned in the above, the endless belt conveyor 43 is adapted to feed the lowermost unsplit sole in the hopper and feed assembly 26 to the splitting stage of my sole splitting machine. This belt conveyor 43 includes a plurality of ribbon-type endless belts 54. These endless belts 54 are mounted on a pulley drive 56 and driven rolls 58 and 60. In an effort to prevent undue flexure of the ribbon-type endless belts 54, when supporting an unsplit sole, a pair of supporting rolls 62 and 64 are advantageously employed. Rolls 58, 60, 62 and 64 may in most respects be identical and include a shaft 66 journaled in suitable bearings 68, which, except for those of roll 60, are mounted by the side plates 16 and 18. The shafts 66 mount a pair of collars 70 and 72 which are formed with suitable recessed portions 73 to accommodate the selected number of ribbon-type endless belts 54.

Referring now to the pulley drive 56, it will be observed that a series of pulleys 74 are mounted on a shaft 76 which is journaled in suitable bearings 78 mounted by the side plates 16 and 18. An end of the shaft 76 extends through the side plate 16 and mounts a coupling 80 which transmits the drive energy supplied by a pneumatic circuit.

This pneumatic circuit includes the usual air motor 82 which drives a reduction gear assembly 84, which is mounted by a pair of reduction gear assembly blocks 86 and 88, and is suitably connected with the coupling 80. The pressurized air for motor 82 is supplied from a conventional source for such medium through an inlet line 90. A gauge 92 is provided in this inlet line 90 for association with an air flow adjusting valve 94 which is similarly inserted in the inlet line 90. A main air On-Off valve 96 is interposed between the adjusting valve 94 and the air motor 82. Thus, when the main valve 96 is opened to provide access for the pressurized air which energizes the air motor 82, and consequently the reduction gear assembly 84 to ultimately impart rotational movement to the drive pulley 56 through the coupling 80, the machine operator need only adjust valve 94 to correspond to any particular pre-selected power output for the air motor 82.

As will be evident from the drawings, the trailing edge of the endless belt conveyor 43 is disposed at a location beyond the gate slide 52 as well as the partitioning plate 30, to thus feed the lowermost unsplit sole in the hopper and feed assembly 26 to the cutting stage for my sole splitting machine. As the unsplit soles pass beneath the gate slide 28, they encounter a pair of power driven rolls 100 and 102 and are fed thereby into the cutting blade 104 and thus split into two sections. Suffice it to say at this time, these power rolls 100 and 102 are driven by means of a transmission gear train 106 which is advantageously coupled with a suitable power source. The upper power roll 100 is supported by a pair of upper arms 108 and 110 which are interconnected by a tie block 111. These arms 108 and 110 are swivelly mounted on a spacer rod 112 by means of bearings 114. This rod 112 mounts a collar 116 which is interposed between the side plates 16 and 18 and functions as a spacer for these plates. A series of thrust washers 118 are suitably positioned upon the spacer rod 112 adjacent its aforementioned mounted components substantially as illustrated. A collar 120 is provided on the end of the rod 112 adjacent the side plate 16 for preventing lateral displacement of this rod 112 in a direction towards the right as viewed in FIG. 5. In this figure it will be appreciated that the other end of this rod 112 is extended to provide a mounting for a part of the transmission gear train 106.

The other power driven roll 102 is similarly supported by lower arms 122 and 124 which in turn are swivelly mounted on a spacer rod 126 by means of suitable bearings 128. A collar 130 is mounted on the spacer rod 126 and cooperates in maintaining the side plates 16 and 18 in the desired spaced-apart relation. A plurality of thrust washers 132 are again advantageously employed as shown. Collar 134 prevents lateral displacement of the spacer rod 126 in a direction toward the right as viewed in FIG. 5.

This spacer rod 126 includes a central bore 136 shown in phantom for accommodating grease introduced through a grease fitting 138 located adjacent the collar 134.

It should be noted at this point that the shaft 66 for the roller 60 of the belt conveyor 43 is journaled in the lower arms 122 and 124. Consequently, the trailing edge of the belt conveyor 43 is shiftable with the lower power roll 102 upon any swivel action of the lower arms 122 and 124 about rod 126. Thus, a suitable disposition of the conveyor trailing edge and lower power roll is assured notwithstanding their permissible displacement.

The upper arms 108 and 110, on the other hand, pivotally mount a pair of idler lever arms 140 and 142, respectively. A shaft 144 is journaled in the free end of these idler lever arms with suitable bearings provided therein. A pair of washers 146 as well as a pair of collars 148 and 150 are mounted on the idler shaft 144. Thus it will be apparent that an idler roll is provided which will function to engage an unsplit sole as it approaches the trailing edge of the conveyor belt assembly 43 before passing through the power drive rolls 100 and 102.

Referring now to the knife 104, it will be observed that a single beveled face 151 is provided which is cooperable with a lower flat face 152 in determining the cutting edge 154. Thus it will be apparent that regardless of any effects of cutting operations or sharpening applications, the cutting edge 154 will be disposed in a plane determined by the lower face 152 of the knife 104. The knife assembly further includes a knife holder 156 which rests suitably upon formed surfaces of side plates 16 and 18 as well as auxiliary plates 20 and 22. The knife blade 104 is adjustably mounted on a plate 158 secured to the knife holder 156. Plate 158 includes a beveled edge 160 cooperable to deflect the lower portion of a split sole in a downward direction and thus follow a selected path. A knife backer 162 is secured to plate 158 and mounts a pair of threaded bolts 164, which, in turn, engage the threads of tapped bores 166 located in the knife blade 104. When the bolts 164 are rotated about their longitudinal axis, the blade 104 will accordingly shift in a substantially horizontal plane to place the cutting edge 154 to its most advantageous position and orientation. To prevent the blade 104 from being undesirably disassociated with the plate 158, a pair of locking screws 168 are supplied for anchoring the blade 104 to the plate 158 after the correct adjustment has been obtained by means of the adjusting screws 164.

The upper arms 108 and 110 securely mount an upper arm extension 170 and 172, respectively. These extensions 170 and 172 are respectively provided with bores 174 and 176, which are preferably aligned with their associated bores 178 and 180 formed in knife holder 156.

The lower arms 122 and 124 similarly mount extensions 182 and 184, respectively. Bores 186 and 188 are provided in these extensions and are disposed substantially coaxial with associated bores 178 and 180 in knife holder 156.

An elongated screw 190 is adapted to freely pass through the bores 174, 178 and 186. The upper end of the screw 190 includes an adjusting knob 192, while the lower end thereof threadedly engages a tapped nut 194. The nut 194 is adapted to transfer stresses to and from the lower face of the lower arm extension 182 through a washer 196. The adjusting knob 192 is provided with a boss extension 198 having an annular flange 200 as well as sprockets 202 for meshing with a chain 204. The annular flange 200 supports one end of a spacer plate 205. A spring adjusting nut 206 is positioned adjacent the boss 198 and similarly includes sprockets 208 for a second chain 210. A spring 212 surrounds a portion of the shaft 190 and is biased at one end against lower faces of the screw adjusting nut 206 and at the other end with a bearing washer 214. Obviously, when the nut 206 is rotated relative to the shaft 190, the bias of the spring 212 will be correspondingly changed.

Another adjusting nut 216 is placed on the shaft 190 for adjusting the bias of spring 218. As illustrated, one end of the spring 218 is compressed against the adjusting nut 216 with the other end bearing against a washer 219, which rests upon the knife holder 156. A projection 220 extends upwardly from nut 214 for engagement with a key slot 221 in the lower face of arm extension 170. A further adjusting nut 222 is positioned on the screw 190 and disposed below the lower face of the knife holder 156. A projection 224 extends from the upper face of nut 222 and is associated with a detent 226 formed in the lower face of the knife holder 156 adjacent the bore 178.

A similar arrangement of parts are provided on the extensions 172 and 184. In this connection, a screw 230 extends through bores 176, 180 and 188 and includes an adjusting knob 232 from which extends a boss 234 having an annular flange 236 and sprockets 238 for engaging the chain 204. The flange 231 provides the necessary support for the other end of spacer plate 205.

A nut 240, through washer 242, provides a support for the lower arm extension 184. An adjusting nut 244 is mounted on the screw 230 adjacent the boss 234 and includes sprockets 246 which cooperate with the chain 210. A spring 248 encircles screw 230 and is biased against the lower face of the adjusting nut 244 and upper face of a washer 250 which bears against the upper face of the upper arm extension 172. An adjusting nut 252 is located on the screw 230 beneath the lower face of the upper arm extension 172 and cooperates with a washer 254 which rests upon the knife holder 156 for suitably compressing a spring 255. A projection 256 projects from the nut 252 and suitably engages with a slot 257 in the upper arm extension 172. An adjusting nut 258 is in engagement with the screw 230 and is provided with a projection 260 which is adapted to be disposed within the detent 262 in the knife holder 156 adjacent bore 180.

Thus, when the screws 190 and 230 are similarly rotated, the power driven rolls 100 and 102 will shift relative to one another as well as with respect to the cutting edge 154 of blade 104. In this connection, it should be apparent that chain 210 enables adjusting nuts 206 and 244 to act in unison and thus relieve or increase the bias of springs 212 and 248, respectively, either with the rotation of screws 190 and 230 or upon the rotation of the subject adjusting nuts. Since adjusting nuts 216, 222, 252 and 258 are keyed and thusly not rotatable with their associated screw, they will be displaced longitudinally relative to such screw upon rotation of either screw. Consequently, the rolls 100 and 102 will shift when either screw is rotated. When these power driven rolls 100 and 102 are rotating to feed an unsplit sole into the blade 104, they should firmly engage this unsplit sole so that the latter does not undesirably shift during the splitting stage.

Accordingly, the screws 190 and 230 should be turned so that their associated springs will provide the necessary resiliency to insure this firm contact. Of course, the bias of the screw mounted springs are properly established by means of their associated adjusting nuts.

To insure that the axis of the power driven rolls 100 and 104 are maintained in their desired parallel relationship upon the turning of the screws 190 and 230, the interconnecting chains 204 and 210 will reduce to a negligible amount the permissible rotation of one screw relative to the other. In effect, the rotation of each screw will be substantially identical by means of this chain-and-sprocket structure. Thus, by simply grasping and turning either knob 192 or 232, to effect rotation of the corresponding screw, the other screw will be actuated and turned substantially instantaneously and equally.

Obviously, when the upper drive roll 100 is displaced, a unit distance with respect to the cutting edge 154 of blade 104, the other power roll 102 should be similarly displaced in the other direction to cooperate to split a sole into two equal parts. Therefore, the mere rotation of the screws 190 and 230 should effect this relative displacement. Thus, the pitch of the threads presented by these screws can be modified along their respective lengths to accommodate this desired displacement. In this connection, the pitch of the threads above the upper face of the knife holder 156 should be in the ratio of 1:2, in comparison with the pitch of the threads below this face.

A bracket 270 projects laterally from the auxiliary plate 22 and includes an upstanding plate 272 which is adapted to support the cantilevered ends of shafts 112 and 126 as well as their associated gears. As shown, the cantilevered end of upper shaft 112 is provided with an internal bore 274 and laterally extending passages for a suitable lubricant which is inserted through a grease fitting 276. A retaining collar 278 is adjacent the grease fitting 276 and is adapted to maintain gears, which are to be described shortly, on the shaft 112.

Initially, a differential bevel gear 280 is keyed to shaft 112 adjacent collar 278 by means of the usual key structure 282. A differential spider 284 is next positioned on the shaft 112 by means of a suitable bearing 286. A second differential bevel gear 288 is mounted on shaft 112 through bearing 290 and has portions thereof extending through upstanding plate 272 and is associated therewith by means of a bearing 292. At least three bevel pinions 294 are engaged with the bevel gears 280 and 288 and extend radially from the axes of the shaft 112 by means of mounting studs 296 and bushings 297. A V-belt pulley 298 is mounted on the spider 284, with bearings 300 interposed between the pinions 294 and the V-belt pulley 298. As will be appreciated by those skilled in the art, the V-belt pulley 298 is adapted to be connected to the usual power source for transmitting rotational energy to the shaft 112.

A bushing 302 ensleeves shaft 112 adjacent bearing 290, with portions of the bevel gear 288 surrounding a part of its outer face. It should be understood at this time that the gears which are mounted on bushings in the gear train are fixedly secured thereto. A gear 304 is then positioned over the remaining portion of the outer face of bushing 302. Bushing 306 is similarly mounted on the shaft 112 and spaced from bushing 302 by means of a thrust washer 308. A gear 310 is mounted on this bushing 306 and is spaced from a similarly mounted gear 312 by means of a thrust washer 314. A gear 316 is keyed to shaft 112 at 318 and is spaced from the bushing 306 as well as gear 312 by means of a thrust washer 320. A third bushing 322 is mounted on the shaft 112 with the thrust washer 324 separating it from the gear 316. A gear 326 embraces part of the outer face of this bushing 322 and is separated from a gear 328 which surrounds a major portion of the remaining part of the outer face of this bushing by means of a thrust washer 330. The gear 328 and its associated part of bushing 322 are spaced from the arm 110 as well as bearing 114 by means of an aforementioned thrust washer 118.

Referring now to the shaft 126, it will be observed that its end, distal the grease fitting 138, is associated with and supported by the upstanding plate 272 by means of a bearing 332. A retaining ring 334 functions to prevent any undesirable longitudinal shifting of the shaft 126. A bushing 336 embraces the shaft 126 and mounts gears 338 and 340 which are separated from one another by means of a thrust washer 342. The teeth of gear 338 are engaged with the teeth of gear 304 of upper shaft 112, while teeth of gear 340 engage teeth of gear 310 of this shaft. A gear 344 is keyed to the shaft 126 at 346 and is spaced from the bushing 336 and gear 340 by a thrust washer 348. This gear meshes with the gear 312 which is mounted on the upper shaft 112. A second bushing 350 is located on the shaft 126 and is spaced from the gear 344 by means of thrust washer 352. Gears 354 and 356, together with an interposed washer 358 are mounted on the bushing 350, with gear 354 engaging gear 316 and gear 356 engaging gear 326. A gear 360 is keyed to shaft 126 by a key structure 362 and is spaced from the gear 356 as well as bushing 350 by means of a thrust washer 364 and from lower arm 124 by means of a thrust washer 132.

A gear 365 is keyed to an upper power roll 100 as at 366 and is rotatable upon rotation of the gear 328 by means of the interposed gear 367. Gear 367 is rotatably mounted on a stud 368, which is threadedly engaged with surfaces of the upper arm 110, by means of bearing 369.

The lower power driven roll 102 similarly has a gear 370 keyed thereto and which is meshed with gear 372 which, in turn, engages gear 360. Gear 372 is mounted on a stud 374 on the lower arm 124 by means of bearing 376. Thus, the lower power roll 102 will rotate upon rotation of the gear 360. It should be noted that irrespective of any displacement of the power rolls 100 and 102, the desired spaced-apart and parallel relationship of the axes of the gears 365, 367 and 328, on one hand, and gears 370, 372 and 360, on the other hand, will be maintained with the mating gear teeth in proper engagement.

Figure 1:
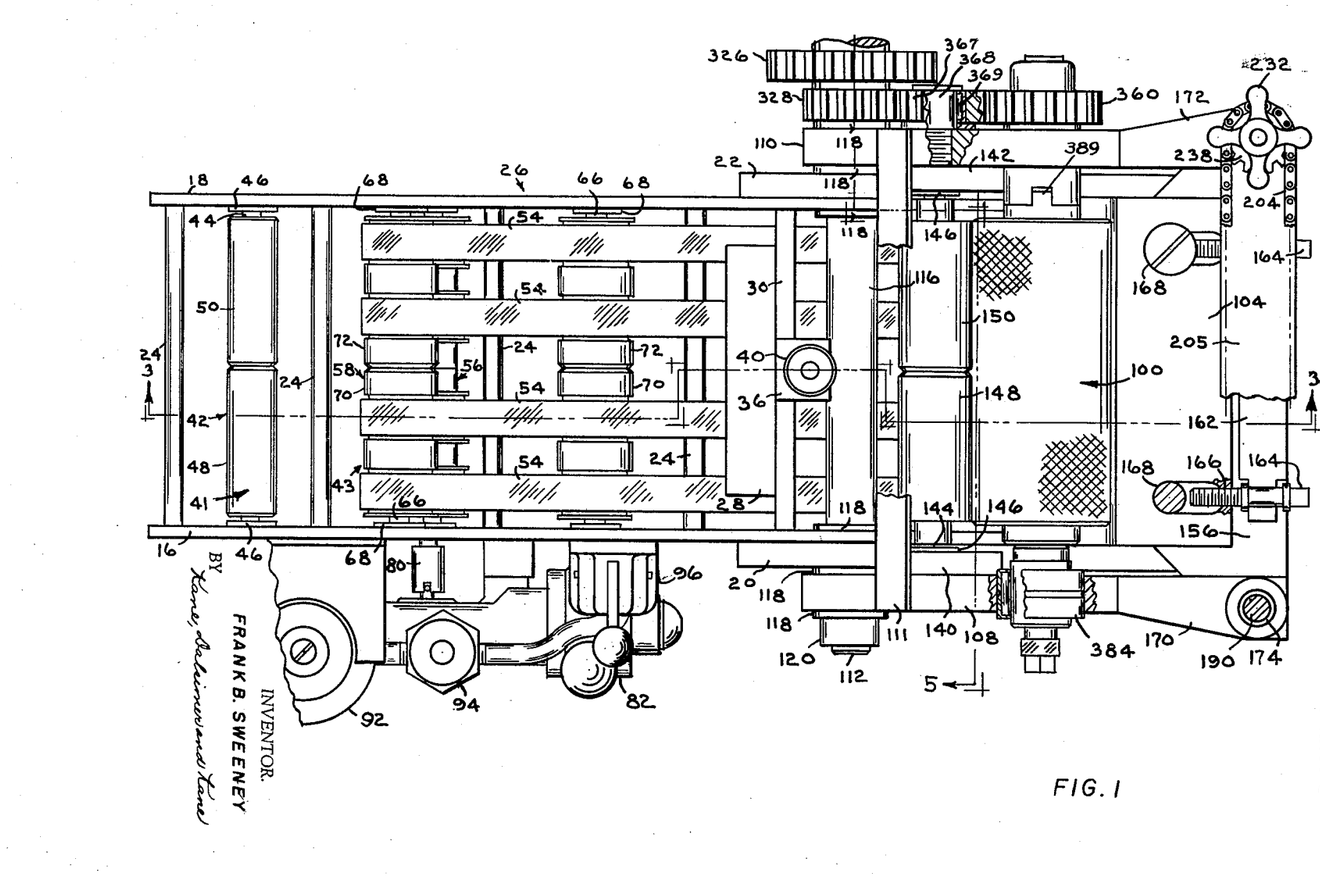
FIG. 1 is a top plan view of a sole trimming machine constructed in accordance with the present invention, with certain parts broken away and removed and with other parts broken away and sectioned.
Figure 2:
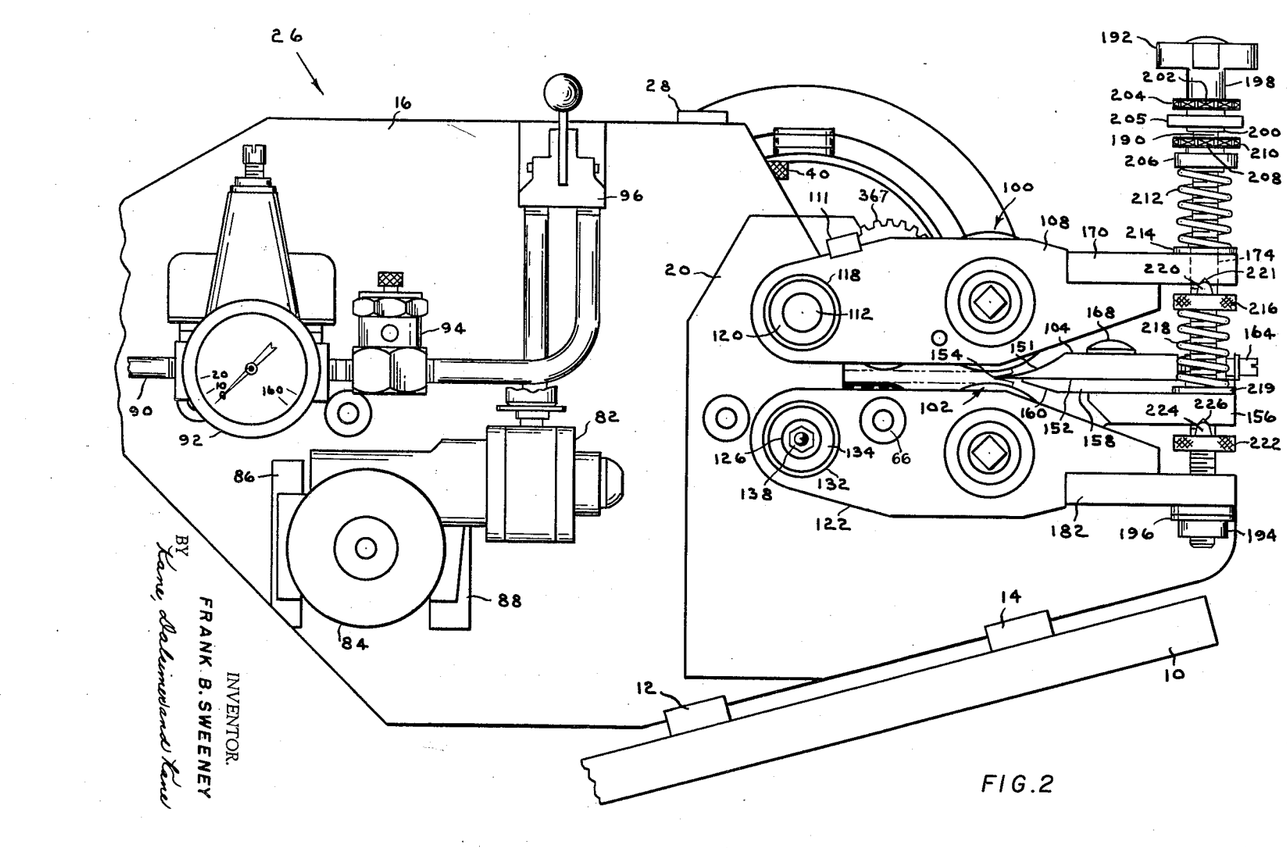
FIG. 2 is a side elevational view of this machine with certain parts broken away and removed.
Figure 3:
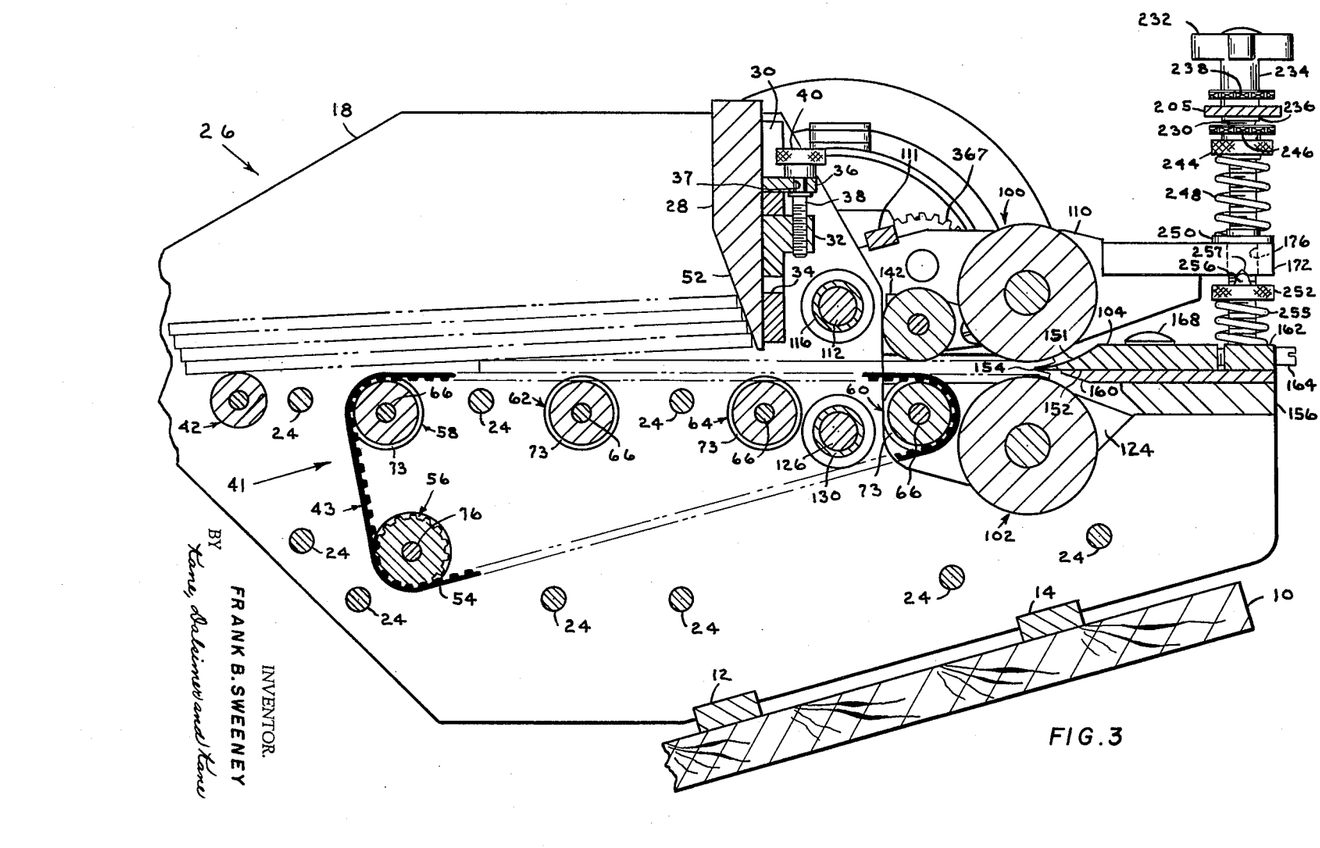
FIG. 3 is a sectional view taken along the line 3—3 of FIG. 1.
Figure 4:
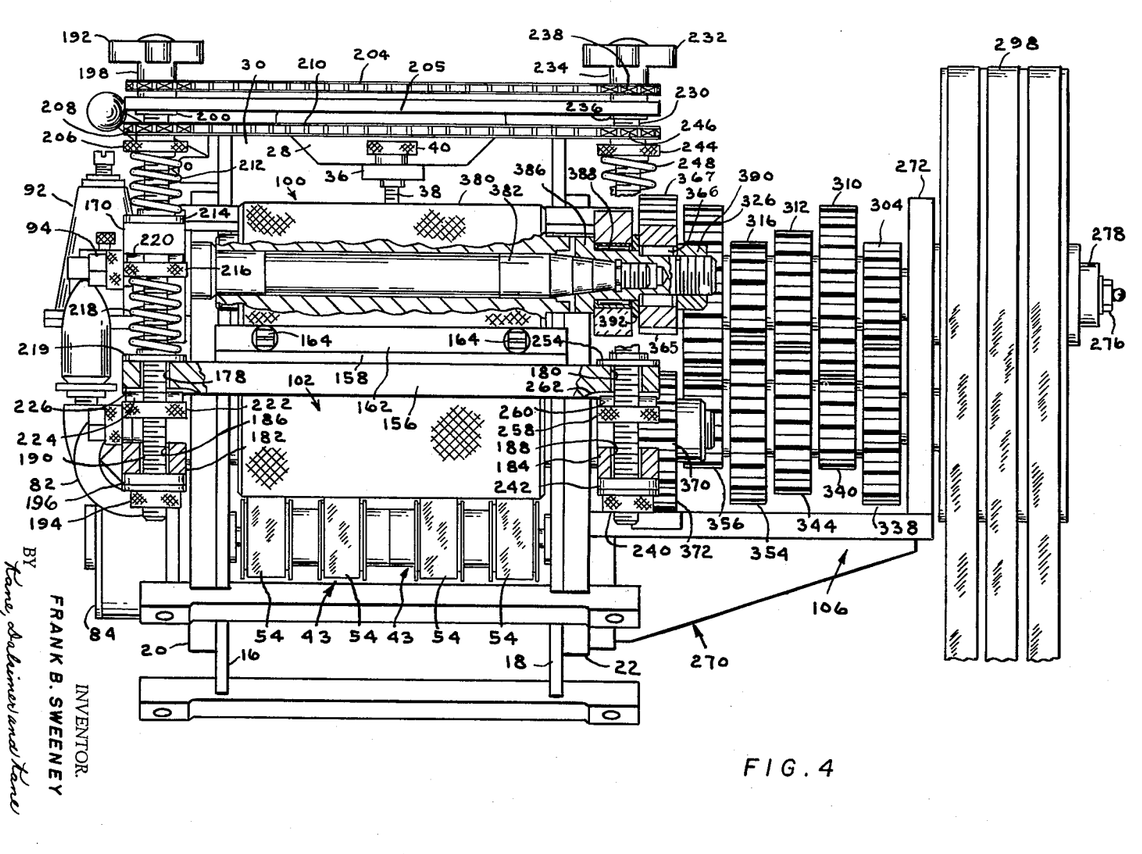
FIG. 4 is an end elevational view with certain parts broken away and sectioned and other parts broken away and removed.
Figure 5:
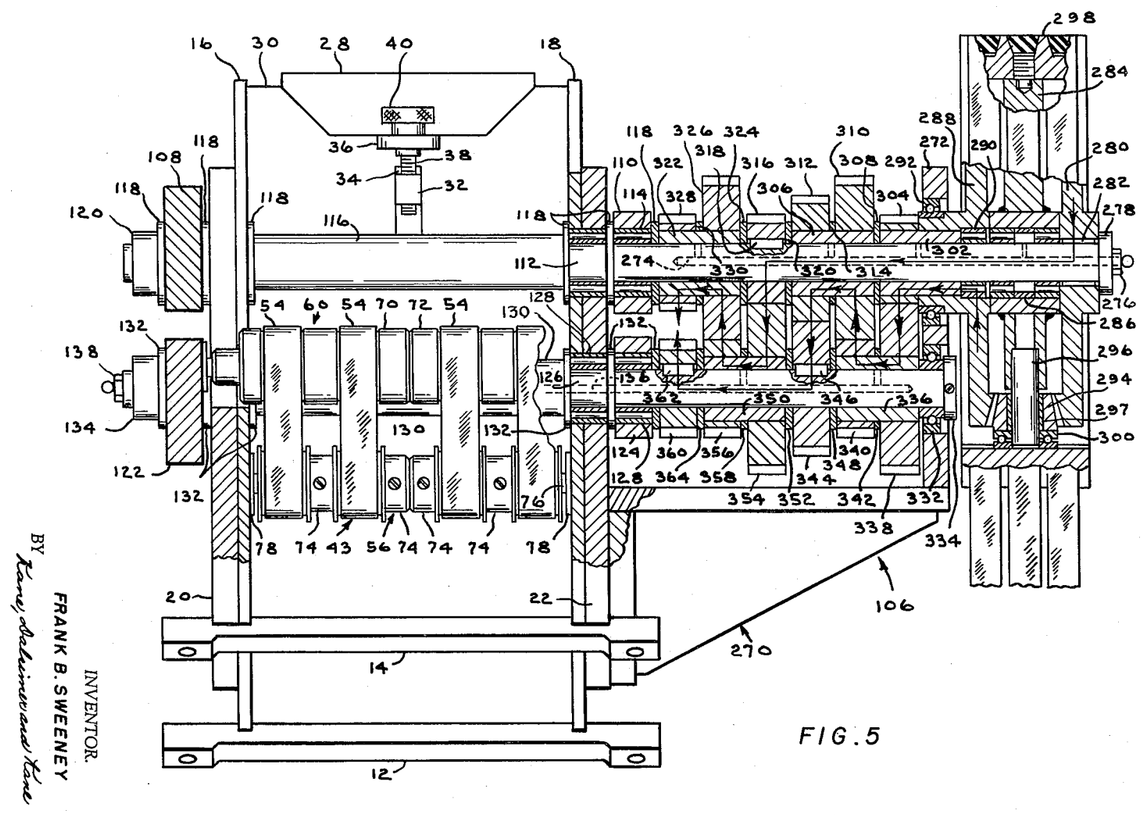
FIG. 5 is another similar end elevational view of this machine with the differential gear transmission train sectioned and with other parts broken away and sectioned.
Figure 6:
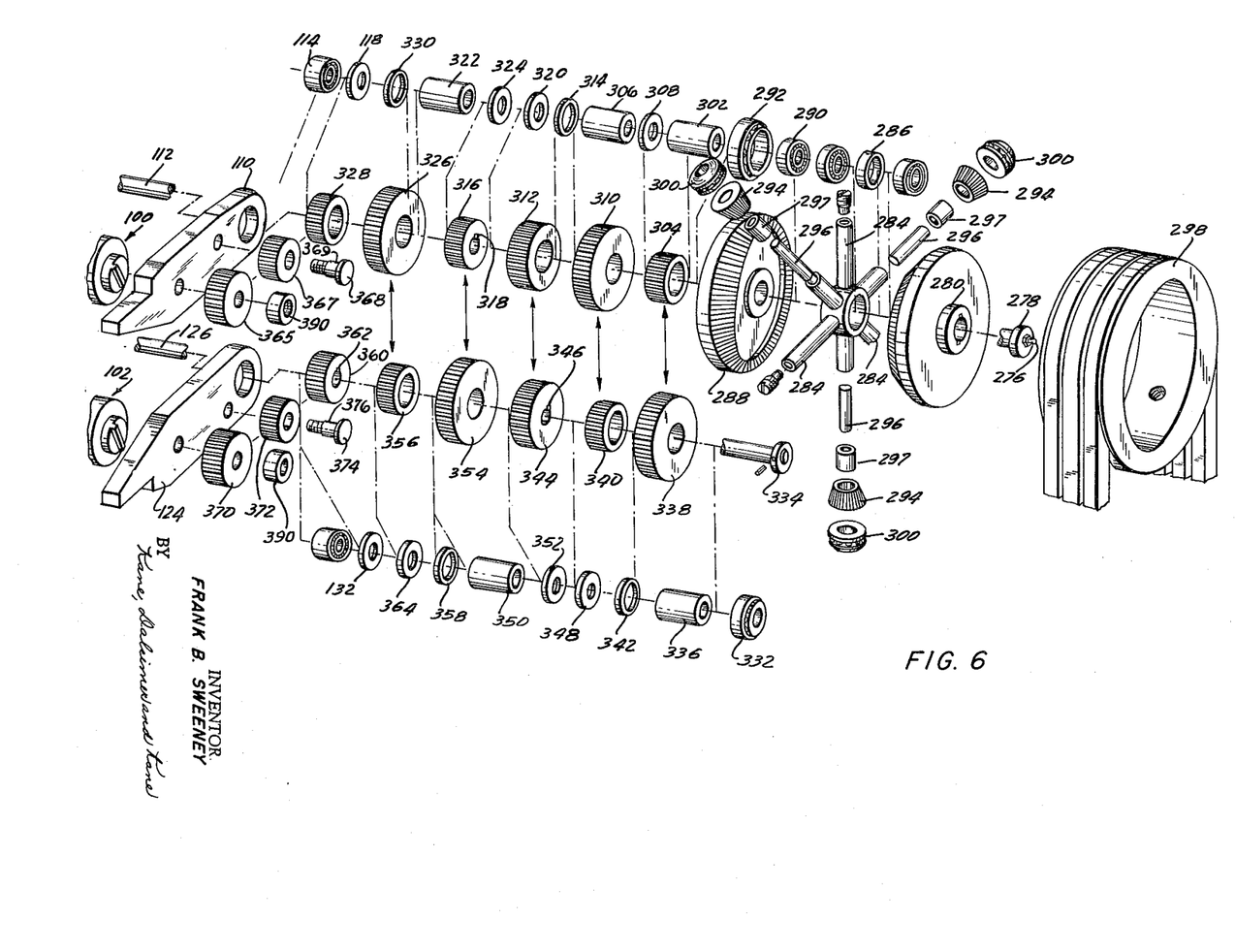
FIG. 6 is an exploded perspective view of the differential gear transmission train and associated structure for driving the feed rolls of this embodiment which, for purposes of this view, are partly broken and removed.

In FIG. 5 these are illustrated as paths of force created when the power rolls 100 and 102 are rotated. It is preferable that these rolls rotate at substantially the same surface speed in feeding an unsplit sole into the knife 104. However, in practice it has been found that from time to time the surface speeds of the power rolls 100 and 102 will not be identical for a plurality of reasons. When this is encountered, the gear train 106, because of its specific design, will compensate for the differential in power roll surface speeds and function to restore them to equality as well as to maintain these speeds at their proper values. In this connection, torques will be established in the gear train 106 when the power roll surface speeds are not equal. These torques will be eliminated by the permissible relative rotation of the bevel gear 286 and 280. This relative rotation is accomplished through the interposed pinions 294 between bevel gears 280 and 288.

Although the sole splitting machine is adapted to minimize undesirable wear of the power rolls 100 and 102, it is contemplated that in time these rolls will be detrimentally effected by extensive use. Therefore, provisions are made for structure by which these rolls can be replaced without affecting other components of my machine within a minimum amount of time without encountering pronounced difficulty.

Accordingly, the upper power roll 100 may include a knurled sleeve 380 on an axle 382, one end of which is journaled in the arm 108 by means of bearing 384. The other end of the axle 382 is coupled with a sleeve 386 journaled in arm 110 by means of bearing 388 and advantageously mounts the gear 360 through the key structure 362. A key 389 interconnects sleeves 380 and 386 to enable both of these sleeves to rotate together. A collar 390 is mounted on a threaded extension of the sleeve 386 and cooperates to maintain the gear 360 on the sleeve 386. A thrust washer 392 may be interposed to maintain the desired spaced-apart relationship between arm 110 and gear 360.

Since the lower power roll 102 includes substantially the same structure as the aforedescribed power roll 100, a detailed description of the structure involved in the former will not be resorted to at this time.

Thus, it should be apparent that this invention contemplates a mechanism for insuring the proper feeding of an unsplit sole into the blade 104. Additionally, the disclosed machine can split into equal segments a sole fabricated from either leather, rubber or other materials employed for this purpose. If desired, this machine can be utilized to simply reduce the thickness of a particular sole. Power roll life is obviously increased by this machine; and the incorporated power rolls are peculiarly adapted to more effectively split or merely reduce in thickness soles and similar articles by means of their drive means as well as their supporting means. In this connection, these power rolls are independent of their driving shafts and, therefore, are capable of being replaced without complete removal of the drive shaft when the feed roll collars wear beyond the permissible limit. It has been found that the aforedescribed machine significantly increases the output of a single operator in comparison with existing and known sole splitting machines to such an extent as to practically double the operator output.

Thus, among others, the numerous objects and advantages are most effectively attained. Although a single practical machine has been described and illustrated, it will be understood that this invention is to be defined by the scope of the appended claims.

I claim:

1. In a thickness reducing machine for soles and the like, including a member having a cutting edge cooperable to reduce one of a plurality of stacked articles to be reduced, which machine further includes a power driven means for feeding said one of said articles to said member such that said one of said articles is reduced by said cutting edge, said power driven means including a differential transmission gear train and two rollers driven by said train for presenting automatically adjustable surface speeds upon engagement of said one of said articles.

2. In a thickness reducing machine for soles and the like, including a member having a cutting edge cooperable to reduce one of a plurality of stacked articles to be reduced, which machine further includes a power driven means for feeding said one of said articles to said member such that said one of said articles is reduced by said cutting edge, said power driven means including a pair of power rolls, a differential gear transmission train for driving said rolls, said gear train cooperable to differentiate between the surface speeds of said rolls and subsequently cooperate to adjust the surface speed of said one of these rolls to correspond with the speed of the other roll.

3. A thickness reducing machine for soles and the like comprising in combination: a hopper and feed assembly for supplying one of a plurality of stacked articles to be reduced, said assembly including a driven conveyor belt mechanism having a trailing edge; a member having a cutting edge cooperable to reduce said one of said articles and power driven means including at least one power driven roll for feeding said one of said articles supplied by said hopper and feed assembly to said member such that said one of said articles is reduced by said cutting edge, a pair of pivotal arms rotatably mounting said roll, and means engageable with surfaces of said arms for varying the disposition of said roll with respect to said cutting edge, said trailing edge of said conveyor belt mechanism being additionally rotatably mounted by said pivotal arms and thus being shiftable upon the varying of the disposition of said roll with respect to said cutting edge.

4. In a thickness reducing machine for soles and the like, including a member having a cutting edge cooperable to reduce one of a plurality of stacked articles to be reduced, said machine further including power driven means for feeding said one of said articles to said member such that said one of said articles is reduced by said cutting edge, said power driven means including a pair of power rolls, shiftable means for mounting each of said rolls, and adjusting means engageable with said shiftable means for varying the disposition of said rolls with respect to said cutting edge, said adjusting means being so constructed and arranged to adjust one roll a unit amount with respect to said cutting edge in one direction while simultaneously therewith adjusting the disposition of the other roll with respect to said cutting edge by an amount substantially equal to that of said unit amount in the other direction.

5. The invention in accordance with claim 4, wherein two similar adjusting means are engageable with said shiftable means, and means interconnecting said two similar adjusting means such that upon actuation of one of said adjusting means, the other adjusting means will be simultaneously and identically actuated.

6. A thickness reducing machine for soles and the like comprising in combination: a hopper and feed assembly for supplying one of a plurality of stacked articles to be reduced; a member having a cutting edge cooperable to reduce said one of said articles; and power driven means for feeding said one of said articles supplied by said hopper and feed assembly to said member such that said one of said articles is reduced by said cutting edge, and said power driven means including a differential transmission gear train and two rollers driven by said train for presenting automatically adjustable surface speed upon engagement of said one of said articles.

7. A thickness reducing machine for soles and the like comprising in combination: a hopper and feed assembly for supplying one of a plurality of stacked articles to be reduced; a member having a cutting edge cooperable to reduce said one of said articles; and power driven means for feeding said one of said articles supplied by said hopper and feed assembly to said member such that said one of said articles is reduced by said cutting edge, said power driven means including a pair of power rolls and a differential gear transmission train for driving said rolls, and said gear train being cooperable to differentiate between the surface speeds of said rolls and subsequently cooperate to adjust the surface speed of one of these rolls to correspond with the speed of the other roll.

References Cited in the file of this patent

UNITED STATES PATENTS

| | | |
|---|---|---|
| 1,194,546 | Ricks | Aug. 15, 1916 |
| 1,302,651 | Funck | May 6, 1919 |
| 2,175,193 | Hood | Oct. 10, 1939 |